US008712645B2

United States Patent
Chassagnol et al.

(10) Patent No.: US 8,712,645 B2
(45) Date of Patent: Apr. 29, 2014

(54) METHOD AND DEVICE FOR MANAGING A TURNING SETPOINT APPLIED TO AT LEAST ONE TURNING ACTUATOR FOR THE REAR WHEELS OF AN AUTOMOBILE

(75) Inventors: Cedric Chassagnol, Clichy (FR); Stephane Guegan, Versailles (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 628 days.

(21) Appl. No.: 12/600,130

(22) PCT Filed: Apr. 22, 2008

(86) PCT No.: PCT/FR2008/050717
§ 371 (c)(1),
(2), (4) Date: Feb. 20, 2010

(87) PCT Pub. No.: WO2008/148965
PCT Pub. Date: Dec. 11, 2008

(65) Prior Publication Data
US 2010/0161181 A1    Jun. 24, 2010

(30) Foreign Application Priority Data
May 14, 2007    (FR) ..................................... 07 55064

(51) Int. Cl.
*B60W 10/18*    (2012.01)
*B60T 17/22*    (2006.01)
*B60T 7/12*    (2006.01)
*B62D 15/02*    (2006.01)
*B62D 6/00*    (2006.01)

(52) U.S. Cl.
USPC ............................................. 701/42; 180/204

(58) Field of Classification Search
None
See application file for complete search history.

(56) References Cited

U.S. PATENT DOCUMENTS

| 4,625,822 | A  | * | 12/1986 | Nakamura et al. ............ 180/415 |
| 4,660,844 | A  | * | 4/1987  | Yamamoto et al. .......... 180/410 |
| 4,720,790 | A  | * | 1/1988  | Miki et al. ..................... 701/41 |
| 4,770,265 | A  | * | 9/1988  | Allen ............................ 180/415 |
| 5,089,967 | A  | * | 2/1992  | Haseda et al. .................. 701/78 |
| 5,642,281 | A  | * | 6/1997  | Ishida et al. ................... 701/41 |
| 5,799,259 | A  | * | 8/1998  | Rief et al. ...................... 701/41 |
| 6,615,944 | B1 | * | 9/2003  | Horwath et al. .............. 180/204 |
| 7,191,047 | B2 | * | 3/2007  | Chen et al. ...................... 701/70 |
| 7,406,374 | B2 | * | 7/2008  | Ono et al. ....................... 701/41 |
| 8,165,755 | B2 | * | 4/2012  | Garcia Estebanez et al. .. 701/42 |

(Continued)

FOREIGN PATENT DOCUMENTS

| DE | 100 53 604  | 5/2002 |
| FR | 2 876 339   | 4/2006 |
| WO | 2006 067340 | 6/2006 |

*Primary Examiner* — John R Olszewski
*Assistant Examiner* — Jean-Paul Cass
(74) *Attorney, Agent, or Firm* — Oblon, Spivak, McClelland, Maier & Neustadt, L.L.P.

(57) ABSTRACT

A method for managing a turning setpoint applied to at least one turning actuator for rear wheels of an automobile including four steering wheels, the turning setpoint being generated by a turning control unit upon a braking situation with asymmetrical adhesion. The method calculates an intermediate turning setpoint of the rear wheels for compensating a yaw torque generated by a braking with asymmetrical adhesion of the four wheels, transmits an intermediate turning setpoint to the at least one turning actuator for the rear wheels, monitors the value of the intermediate turning setpoint using an acceptation module, and transmits to a braking control unit information generated by the acceptation module of the intermediate turning setpoint.

7 Claims, 3 Drawing Sheets

(56) References Cited

U.S. PATENT DOCUMENTS

| | | |
|---|---|---|
| 2002/0198646 A1 | 12/2002 | Bedner et al. |
| 2003/0122417 A1 | 7/2003 | Hackl et al. |
| 2005/0275283 A1 | 12/2005 | Tsukasaki |
| 2009/0194359 A1 | 8/2009 | Chassagnol et al. |
| 2010/0138112 A1* | 6/2010 | Suzuki et al. .................. 701/42 |
| 2012/0029780 A1* | 2/2012 | Foussard et al. ............... 701/69 |

* cited by examiner

METHOD AND DEVICE FOR MANAGING A TURNING SETPOINT APPLIED TO AT LEAST ONE TURNING ACTUATOR FOR THE REAR WHEELS OF AN AUTOMOBILE

TECHNICAL FIELD

The invention relates to the field of turning control systems for a motor vehicle with four steering wheels. Such systems may be coupled to a braking system making it possible to compensate for the yaw torque created by braking with asymmetrical adhesion also called "MuSplit" braking. The control system of the four steering wheels also comprises a turning control unit of the rear wheels of the vehicle designated by the term "4RD computer", which compensates for the yaw torque by turning the rear wheels of the vehicle through an appropriate angle. This angle is calculated by an algorithm in the braking computer called the "ESP computer". The angle is then transmitted to the 4RD computer.

PRIOR ART

In general, and as described in document FR-2 866 339, it is known practice to use, in a motor vehicle, both a 4RD computer and an ESP computer in order to compensate for MuSplit braking.

However, in the known 4RD computers, the algorithms which make it possible to calculate the turning angle in a braking situation with asymmetrical adhesion do not make it possible to ensure optimum braking of the vehicle since, on the one hand, an item of turning control information may be incorrect, and, on the other hand, the ESP computer may command braking causing too high a yaw torque which the turning angle of the rear wheels would not be able to compensate for.

Therefore, the object of the invention is to ensure optimal braking of a vehicle travelling on a pavement with asymmetrical adhesion.

DESCRIPTION OF THE INVENTION

The invention therefore relates to a method for managing a turning setpoint applied to at least one turning actuator of the rear wheels of a motor vehicle comprising four steering wheels. Such a turning setpoint is generated by a control unit during a braking situation with asymmetrical adhesion.

Moreover, the method comprises the steps consisting in:
calculating an intermediate turning setpoint of the rear wheels making it possible to compensate for a yaw torque generated by the braking with asymmetrical adhesion of the four wheels,
transmitting the intermediate turning setpoint to the turning actuator of the rear wheels.

According to the invention, the method is characterized in that it comprises the steps consisting in,
monitoring the value of said intermediate turning setpoint by means of an acceptance module,
transmitting to a braking control unit an item of information generated by the acceptance module of the intermediate turning setpoint.

In other words, such a monitoring of the turning setpoint limits the risks of the use of an incorrect turning setpoint by the turning control unit which is the 4RD computer. Moreover, it is possible to optimize the braking of the vehicle by braking the wheels with good adhesion, only if the 4RD computer is capable of compensating for the yaw torque that would be generated by such braking. Such a method makes it possible to adopt the braking strategy that is safest for the driver of the vehicle and the most appropriate to the situation in order to reduce the braking distance and prevent the vehicle from spinning.

In practice, the intermediate braking setpoint may be computed by the braking control unit. In other words, the intermediate turning setpoint is computed by the ESP computer.

Advantageously, the step of monitoring the intermediate turning setpoint can be carried out in a turning control unit of the rear wheels.

Therefore, after having been computed, the intermediate turning setpoint is transmitted to the 4RD computer which makes it possible to monitor the value of this intermediate turning setpoint. The acceptance module is therefore incorporated into the 4RD computer.

In other words, the ESP computer makes it possible both to determine the braking setpoint to be applied to the wheels of the vehicle, but also to generate the intermediate turning setpoint in order to compensate for a yaw torque generated by the braking with asymmetrical adhesion of the wheels.

Moreover, the transmission of the information generated by the acceptance module may be carried out when certain parameters are detected and transmitted to the 4RD computer. For this, many sensors may be used and are connected to the 4RD computer.

According to a first embodiment, the item of information may be transmitted to the braking unit when a braking control member is actuated by the driver of the vehicle.

Therefore, a sensor may be associated with the hydraulic circuit controlled by the brake pedal of the vehicle and makes it possible to inform the 4RD computer and the ESP computer that this member is actuated. In this case, the 4RD computer agrees to apply the intermediate turning setpoint and notifies the ESP computer thereof.

According to a second embodiment, an item of information may be transmitted to the turning control unit when a braking assistance system is activated.

In this case, the method for managing the braking setpoint is used only during braking with assistance making it possible to prevent the wheels from locking. When this assistance system is used, the ESP computer informs the 4RD computer thereof which will accept the intermediate turning setpoint.

According to a third embodiment, the item of information may be transmitted to the turning and braking control unit when the vehicle is travelling forward.

In this manner, the method is not used when the vehicle is travelling in reverse. To do this, a sensor may notably be positioned at the gearbox of a transmission shaft or of the wheels of the vehicle.

According to a fourth embodiment, the item of information may be transmitted to the braking control unit when a communication is established between the braking control unit and the turning control unit of the rear wheels. In this case, computing the intermediate turning setpoint is avoided notably when braking is no longer asymmetrical.

According to a particular embodiment, the communication may be carried out by means of an incremental signal. Such a signal may take the form of a cyclical clock signal varying from 0 to 15 and incremented every ten milliseconds when the ESP computer sends an intermediate turning setpoint to the 4RD computer.

Advantageously, these four conditions may be combined and make it possible to reduce the risk of applying an incorrect turning setpoint to the rear wheels of the vehicle during braking with asymmetrical adhesion.

The invention also relates to a device for managing a turning setpoint applied to at least one turning actuator of the rear wheels of a motor vehicle comprising four steering wheels. The turning setpoint is generated by a turning control unit during a braking situation with asymmetrical adhesion.

According to the invention, the management device is characterized in that it comprises an acceptance module of the value of an intermediate turning setpoint computed by a braking control unit. The acceptance module is capable of monitoring the value of the intermediate turning setpoint.

In other words, the value of the intermediate turning setpoint is monitored by the acceptance module, which makes it possible to limit the risk of transmitting an incorrect turning setpoint to the turning actuator of the rear wheels.

According to a particular embodiment, the acceptance module of the intermediate turning setpoint may be incorporated into the turning control unit of the rear wheels. In this manner, when the acceptance conditions are validated, the 4RD computer can directly transmit the intermediate turning setpoint to the turning actuator making it possible to orient the rear wheels of the vehicle in order to compensate for the yaw torque generated by braking with asymmetrical adhesion. Such an arrangement is therefore very sensitive and reactive.

BRIEF DESCRIPTION OF THE FIGURES

The manner in which the invention is embodied and the advantages that are derived therefrom will clearly emerge from the following embodiment, given as an indication but in no way limiting, supported by the following figures in which.

MANNER OF EMBODYING THE INVENTION

The invention therefore relates to a method and a device for managing a turning setpoint of the rear wheels of a vehicle with four steering wheels so as to compensate for the yaw torque generated during braking with asymmetrical adhesion of the vehicle.

Such a device therefore comprises a 4RD computer 14 which makes it possible to generate a turning setpoint 17 of the rear wheels of the vehicle. To do this, the 4RD computer 14 comprises a first handleability and stability module taking into consideration various items of information that are the speed of the vehicle, the angle of the steering wheel and the direction of travel of the vehicle.

Figure 1:
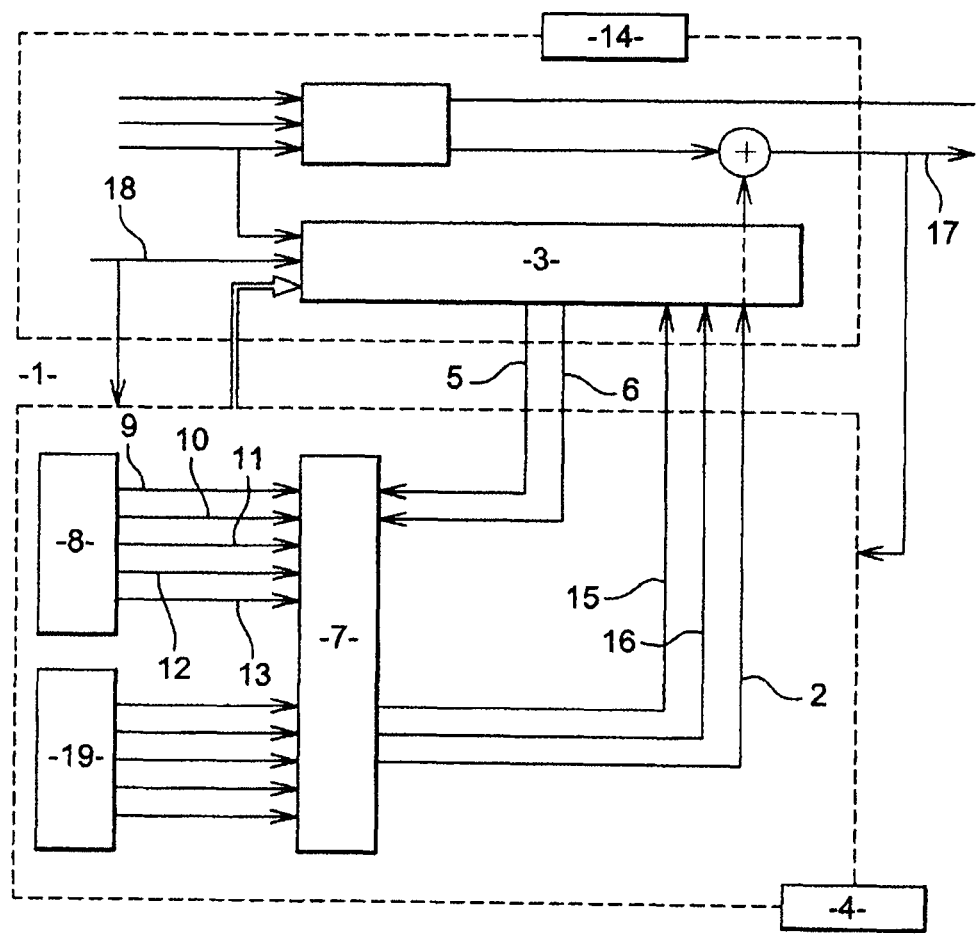
FIG. 1 is a schematic representation of the management method, according to the invention.

As shown in FIG. 1, such a 4RD computer 14 also comprises an acceptance module 3 of the intermediate turning setpoint 2 computed by the ESP computer 4. Such an acceptance module 3 receives, for its part, items of information that are the activation of braking by the driver of the vehicle and the activation of the braking assistance system. Moreover, the ESP computer 4 comprises an MSC module 7 making it possible to produce an algorithm for computing the intermediate turning setpoint 2 in order to compensate for the yaw torque during braking on dissymmetrical adhesion. This MSC module 7 for its part generates an item of information of cyclical type according to a clock varying from 0 to 15 and incremented every ten milliseconds when the ESP computer 4 sends an intermediate turning setpoint 2.

The MSC module 7 also generates an item of binary information 15 equal to 0 when the ESP computer 4 sends no intermediate turning setpoint 2 and equal to 1 in the converse situation.

Figure 2:
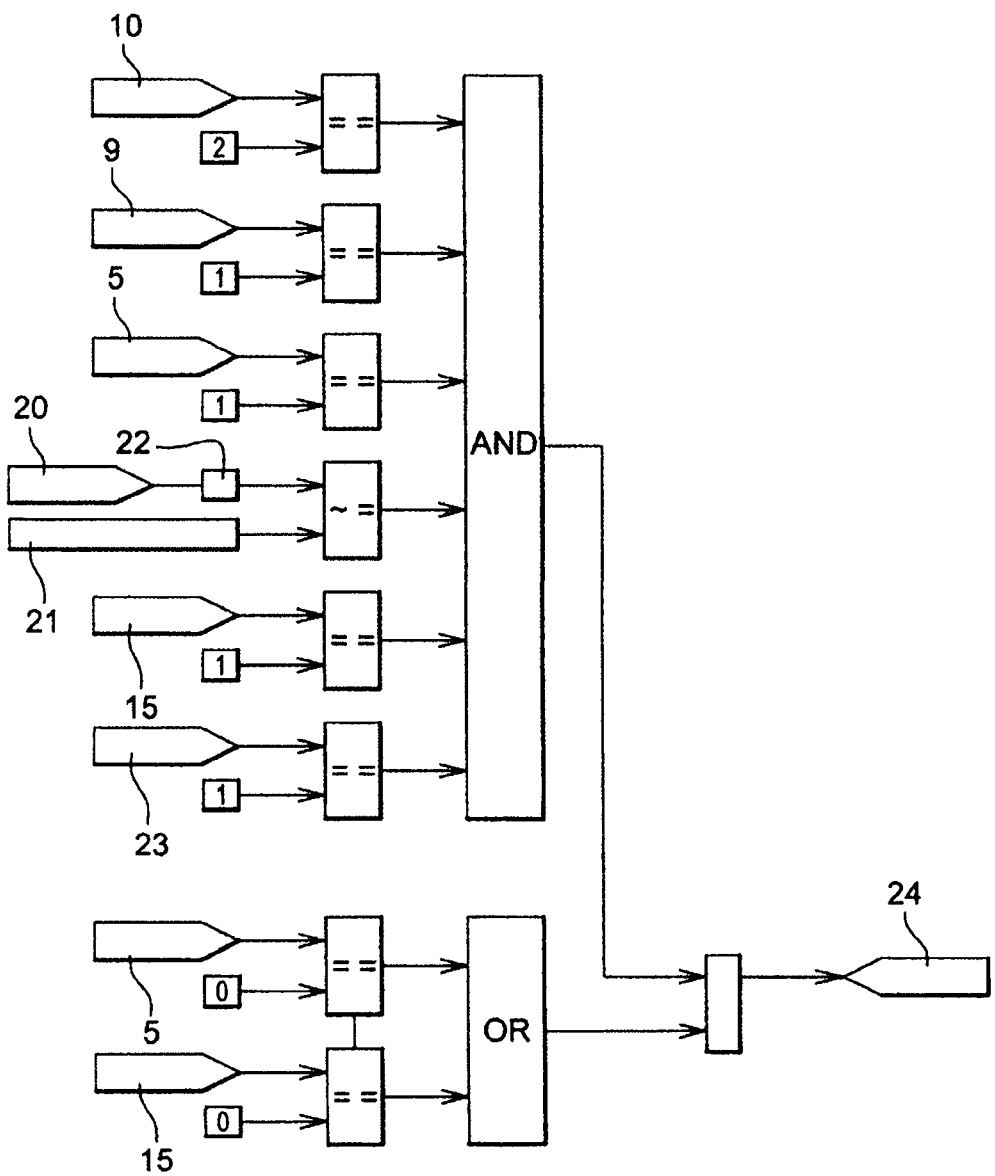
FIG. 2 is a schematic representation of the conditions to be respected for transmitting the information making it possible to allow the use of a turning setpoint of the rear wheels during braking on asymmetrical adhesion.

As shown in FIG. 2, to allow the computation of the intermediate turning setpoint 2, the internal variable 24 must be pulled up, that is to say switch from 0 to 1, at the moment T. This event occurs when all the following conditions are verified:

the signal 10 representative of the actuation of the braking member must be equal to the value 2, which corresponds to a pressure in the master cylinder that is greater than 6 bar;

the signal 9 which corresponds to the regulation of braking assistance systems must be equal to 1, which corresponds to an ABS regulation being used;

the signal 5 representative of the communication between the 4RD computer 14 and the ESP computer 4 must be equal to 1, which is the case when no communication problem is detected between these two computers.

Monitoring of the "MuSplit" clock generating a signal 20 is detected by means of a time delay computing unit and compared with a second signal 21. A sampling period T of 10 ms is moreover used and a failure of the "MuSplit" clock can be detected if, at a moment t, at least one of the three following conditions is fulfilled for more than three periods T:

$$[\text{MuSplitClock}(t) - \text{MuSplitClock}(t-T)] > 2$$

$$[\text{MuSplitClock}(t) - \text{MuSplitClock}(t-T)] < 0 \text{ and}$$

$$(16 + [\text{MuSplitClock}(t) - \text{MuSplitClock}(t-T)]) > 2$$

$$\text{MuSplitClock}(t) = \text{MuSplitClock}(t-T) = \text{MuSplitClock}(t-2T).$$

Moreover, the signal 5 serves as a flag the default value of which is 1, but it may be set to zero if at least one of the following conditions is fulfilled:

the signal 17 is equal to 3.84 corresponding to an invalid value more than twice in succession;

the CAN frame containing the setpoint 17 is absent for more than 40 ms;

a failure of the MuSplit clock has been detected.

If the flag 5 is set to zero once, it will retain this value until the next time the vehicle is switched on.

These monitoring actions are active all the time the vehicle is running, even outside MuSplit braking situations. The only exception relates to the wake-up phases of the computers indicated by the value 0 or 1 of the Generic Applicative Diag Enable variable.

Moreover, the flag 24 is set to zero at the moment t if one of the following two conditions is verified:

the information generated by the signal 15 is equal to 0 at the moment t, that is to say that the ESP is not sending any turning signal;

the flag 5 is set to zero, which is representative of a communication problem between the 4RD computer 14 and the ESP computer 4.

Figure 3:
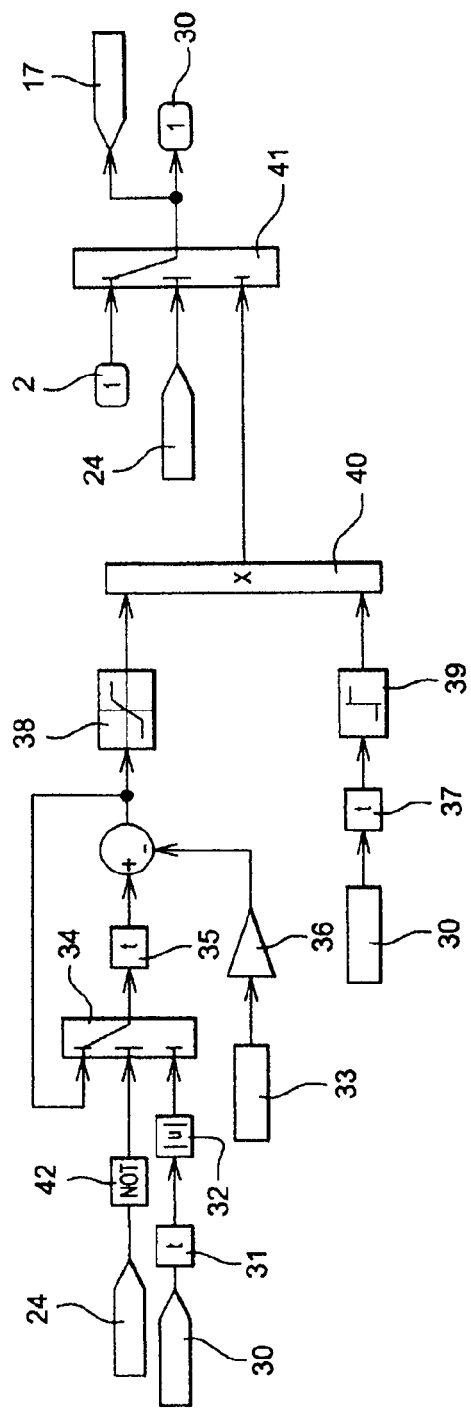
FIG. 3 is a schematic representation of the determination of the intermediate turning setpoint value that is actually applied by the 4RD.

As shown in FIG. 3, the MuSplit setpoint 17 actually taken into account corresponds to the intermediate turning setpoint 2 when the flag 24 is equal to 1. Moreover, when the flag 24 is equal to 0, the MuSplit setpoint 17 decreases progressively to 0.

In this manner, the intermediate turning setpoint 2 originating from the ESP computer 4 is accepted only if the driver brakes, an ABS regulation is in progress, the vehicle is travelling forward and the MuSplit clock is operating correctly. This restriction greatly limits the probability of accepting a potentially incorrect turning setpoint.

Figure 4:
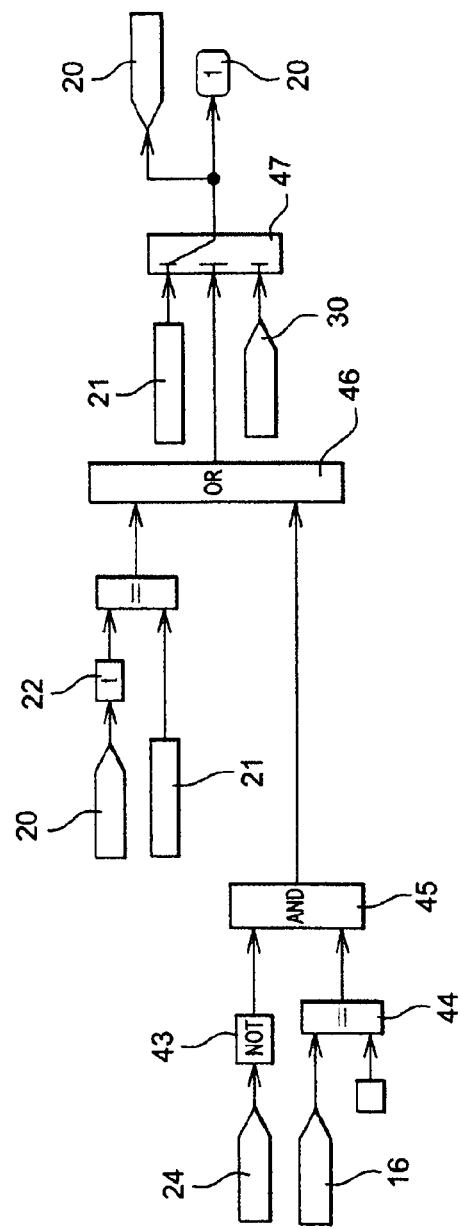
FIG. 4 is a schematic representation of the determination of the turning setpoint value sent back to the ESP computer.

As shown in FIG. 4, an item of information 6 is sent to the ESP computer 4. This item of information 6 is equal to 3.84, which corresponds to an invalid value if one of the two following conditions is true:

the flag 24 is equal to zero and the signal 15 is equal to 1, which corresponds to the situation in which the ESP computer 4 sends an intermediate turning setpoint 2 to the 4RD computer 14 and a communication problem is detected between the two computers;

the value of the item of information 6 at the moment t−1 was equal to 3.84, which corresponds to an invalid value.

If none of the above two conditions is true, the item of information 6 is equal to the turning setpoint 17 at the output of the 4RD computer 14.

In this manner, if a turning setpoint is requested by the ESP computer 4 and rejected by the 4RD computer 14, the ESP computer 4 is notified by the item of information 6 which is equal to the value 3.84.

Moreover, if a turning setpoint is rejected once, it is rejected for the rest of the mission, that is to say until the next ignition switch-off.

The braking computer adapts its braking power on the high-adhesion side when it is notified that the 4RD computer 14 is not operating or that the MuSplit setpoint will not be accepted, that is to say that the item of information 5 is equal to zero or that the item of information 6 is equal to 3.84.

It emerges from the foregoing that a method and a device according to the invention have many advantages, and notably:

they make it possible to prevent the use of an incorrect turning setpoint and the risks of an accident during MuSplit braking;

they make it possible to optimize braking so as to ensure the shortest stopping distance in the event of an emergency and asymmetrical adhesion.

The invention claimed is:

1. A method for managing a turning setpoint applied to at least one turning actuator of rear wheels of a motor vehicle including four steering wheels, the turning setpoint being generated by a braking control unit during a braking situation with asymmetrical adhesion, the method comprising:

calculating a turning setpoint of the rear wheels making it possible to compensate for a yaw torque generated by the braking with asymmetrical adhesion of the four wheels;

transmitting the turning setpoint to the at least one turning actuator of the rear wheels;

monitoring a value of the turning setpoint by an acceptance module which either accepts the turning setpoint or does not accept the turning setpoint, the monitoring including the acceptance module accepting the turning setpoint when:

a braking control member is actuated by a driver of the vehicle, a braking assistance system is activated, the vehicle is travelling forward, and a communication is established between the braking control unit and a turning control unit;

when the acceptance module accepts the turning setpoint, transmitting to the braking control unit an item of information generated by the acceptance module and indicating to the braking control unit that the turning setpoint was accepted, and turning, via the turning actuator, the rear wheels of the motor vehicle according to the turning setpoint in order to compensate for the yaw torque generated by the braking with asymmetrical adhesion of the four wheels; and when the acceptance module does not accept the turning setpoint, transmitting to the braking control unit an item of information generated by the acceptance module and indicating to the braking control unit that the turning setpoint was not accepted, and adapting the braking applied to the rear wheels of the motor vehicle without turning the rear wheels of the motor vehicle according to the turning setpoint.

2. The method for managing a turning setpoint as claimed in claim 1, wherein the monitoring the turning setpoint value is carried out in the turning control unit of the rear wheels.

3. The method for managing a turning setpoint as claimed in claim 1, wherein the turning setpoint is calculated by the braking control unit.

4. A management device of a turning setpoint applied to at least one turning actuator of rear wheels of a motor vehicle including four steering wheels, the turning setpoint being generated by a turning control unit during a braking situation with asymmetrical adhesion, the management device comprising:

an acceptance module which either accepts a value of a turning setpoint calculated by a braking control unit or does not accept the turning setpoint, and the acceptance module monitors the value of the turning setpoint and accepts the turning setpoint when:

a braking control member is actuated by a driver of the vehicle, a braking assistance system is activated, the vehicle is travelling forward, and a communication is established between the braking control unit and the turning control unit, wherein the acceptance module transmits to the braking control unit an item of information generated by the acceptance module of the turning setpoint and indicating to the braking control unit that the turning setpoint was accepted, and the turning actuator turns the rear wheels of the motor vehicle according to the turning setpoint in order to compensate for the yaw torque generated by the braking with asymmetrical adhesion of the four wheels when the acceptance module accepts the turning setpoint, and transmits to the braking control unit an item of information generated by the acceptance module and indicating to the braking control unit that the turning setpoint was not accepted, and the braking control unit adapts the braking applied to the rear wheels without turning the rear wheels of the motor vehicle according to the turning when the acceptance module does not accept the turning setpoint.

5. The device as claimed in claim 4, wherein the acceptance module of the turning setpoint is incorporated into the turning control unit of the rear wheels.

6. The method for managing a turning setpoint as claimed in claim 1, wherein the communication is not established between the braking control unit and the turning control unit when braking occurs without asymmetrical adhesion.

7. The device as claimed in claim 4, wherein the communication is not established between the braking control unit and the turning control unit when braking occurs without asymmetrical adhesion.

* * * * *